(12) United States Patent
Okamoto et al.

(10) Patent No.: US 11,118,493 B2
(45) Date of Patent: Sep. 14, 2021

(54) ELECTRIC HEATING TYPE SUPPORT AND EXHAUST GAS PURIFYING DEVICE

(71) Applicant: NGK INSULATORS, LTD., Nagoya (JP)

(72) Inventors: Naoki Okamoto, Nagoya (JP); Naoya Takase, Konan (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/989,068

(22) Filed: Aug. 10, 2020

(65) Prior Publication Data

US 2021/0087960 A1    Mar. 25, 2021

(30) Foreign Application Priority Data

Sep. 24, 2019    (JP) .............................. JP2019-173581

(51) Int. Cl.
| | |
|---|---|
| *F01N 3/20* | (2006.01) |
| *F01N 3/28* | (2006.01) |
| *B01J 35/04* | (2006.01) |
| *B01D 53/94* | (2006.01) |

(52) U.S. Cl.
CPC ........... *F01N 3/2026* (2013.01); *B01D 53/94* (2013.01); *B01J 35/04* (2013.01); *F01N 3/2828* (2013.01); *B01D 2255/9155* (2013.01); *F01N 2330/06* (2013.01); *F01N 2330/32* (2013.01)

(58) Field of Classification Search
None
See application file for complete search history.

(56) References Cited

U.S. PATENT DOCUMENTS

2013/0036719 A1\*  2/2013  Noguchi ............... F01N 3/2026
                                              55/523
2018/0280872 A1   10/2018  Noro

FOREIGN PATENT DOCUMENTS

JP          2018-172258 A1    11/2018

\* cited by examiner

*Primary Examiner* — Jelitza M Perez
(74) *Attorney, Agent, or Firm* — Burr & Brown, PLLC

(57) ABSTRACT

An electric heating type support includes: a pillar shaped honeycomb structure being configured to a ceramic, including: an outer peripheral wall; and a partition wall disposed on an inner side of the outer peripheral wall, the partition wall defining a plurality of cells, each of the cells extending from one end face to other end face to form a flow path; an electrode layer disposed on a surface of the outer peripheral wall of the pillar shaped honeycomb structure; two or more underlayers having conductivity, the underlayers being provided on the electrode layer so as to be spaced apart from each other; and a metal electrode provided on the underlayers.
A surface of each of the underlayers has a concave portion forming a space between each of the underlayers and the metal electrode.

13 Claims, 17 Drawing Sheets

ELECTRIC HEATING TYPE SUPPORT AND EXHAUST GAS PURIFYING DEVICE

FIELD OF THE INVENTION

The present invention relates to an electric heating type support and an exhaust gas purifying device. More particularly, it relates to an electric heating type support and an exhaust gas purifying device, which can provide good suppression of a temperature difference generated in underlayers during current conduction, and also suppress cracks in the underlayers by providing good suppression of heat conduction to metal electrodes.

BACKGROUND OF THE INVENTION

Recently, electric heating catalysts (EHCs) have been proposed to improve exhaust gas purification performance immediately after engine starting. The EHC is a catalyst for allowing a temperature of the catalyst to be increased to an activation temperature prior to the engine starting by connecting electrodes on a pillar shaped honeycomb structure made of conductive ceramics, and conducting a current to heat the honeycomb structure itself. The EHCs are desired to reduce temperature unevenness in the honeycomb structure to have a uniform temperature distribution, in order to obtain a sufficient catalytic effect.

The metal electrodes are made of a different material from that of the ceramic honeycomb structure. Therefore, applications used in a high-temperature oxidizing atmosphere such as in an exhaust pipe of a motor vehicle are required to ensure mechanical and electrical joining reliability between the honeycomb structure and the metal terminals in the high-temperature atmosphere.

To solve such problems, Patent Literature 1 discloses that thermal energy is applied from metal terminal (metal electrode) sides to join the metal electrodes to electrode layers of a honeycomb structure by means of welding. Further, it discloses that according to such a structure, it is possible to provide a conductive honeycomb structure with improved joining reliability to the metal terminals.

CITATION LIST

Patent Literature

[Patent Literature 1] Japanese Patent Application Publication No. 2018-172258 A

SUMMARY OF THE INVENTION

The present invention is specified as follows:
(1)
  An electric heating type support, comprising:
  a pillar shaped honeycomb structure being configured to a ceramic, comprising: an outer peripheral wall; and a partition wall disposed on an inner side of the outer peripheral wall, the partition wall defining a plurality of cells, each of the cells extending from one end face to other end face to form a flow path;
  an electrode layer disposed on a surface of the outer peripheral wall of the pillar shaped honeycomb structure;
  two or more underlayers having conductivity, the underlayers being provided on the electrode layer so as to be spaced apart from each other; and
  a metal electrode provided on the underlayers, wherein a surface of each of the underlayers has a concave portion forming a space between each of the underlayers and the metal electrode.
(2)
  An electric heating type support, comprising:
  a pillar shaped honeycomb structure being configured to a ceramic, comprising: an outer peripheral wall; and a partition wall disposed on an inner side of the outer peripheral wall, the partition wall defining a plurality of cells, each of the cells extending from one end face to other end face to form a flow path;
  an electrode layer disposed on a surface of the outer peripheral wall of the pillar shaped honeycomb structure;
  two or more underlayers having conductivity, the underlayers being provided on the electrode layer so as to be spaced apart from each other; and
  a metal electrode provided on the underlayers,
  wherein a surface of the metal electrode has a concave portion forming a space between the metal electrode and each of the underlayers.
(3)
  An exhaust gas purifying device, comprising:
  the electric heating type support according to (1) or (2); and
  a can body holding the electric heating type support.

DETAILED DESCRIPTION OF THE INVENTION

Figure 1:
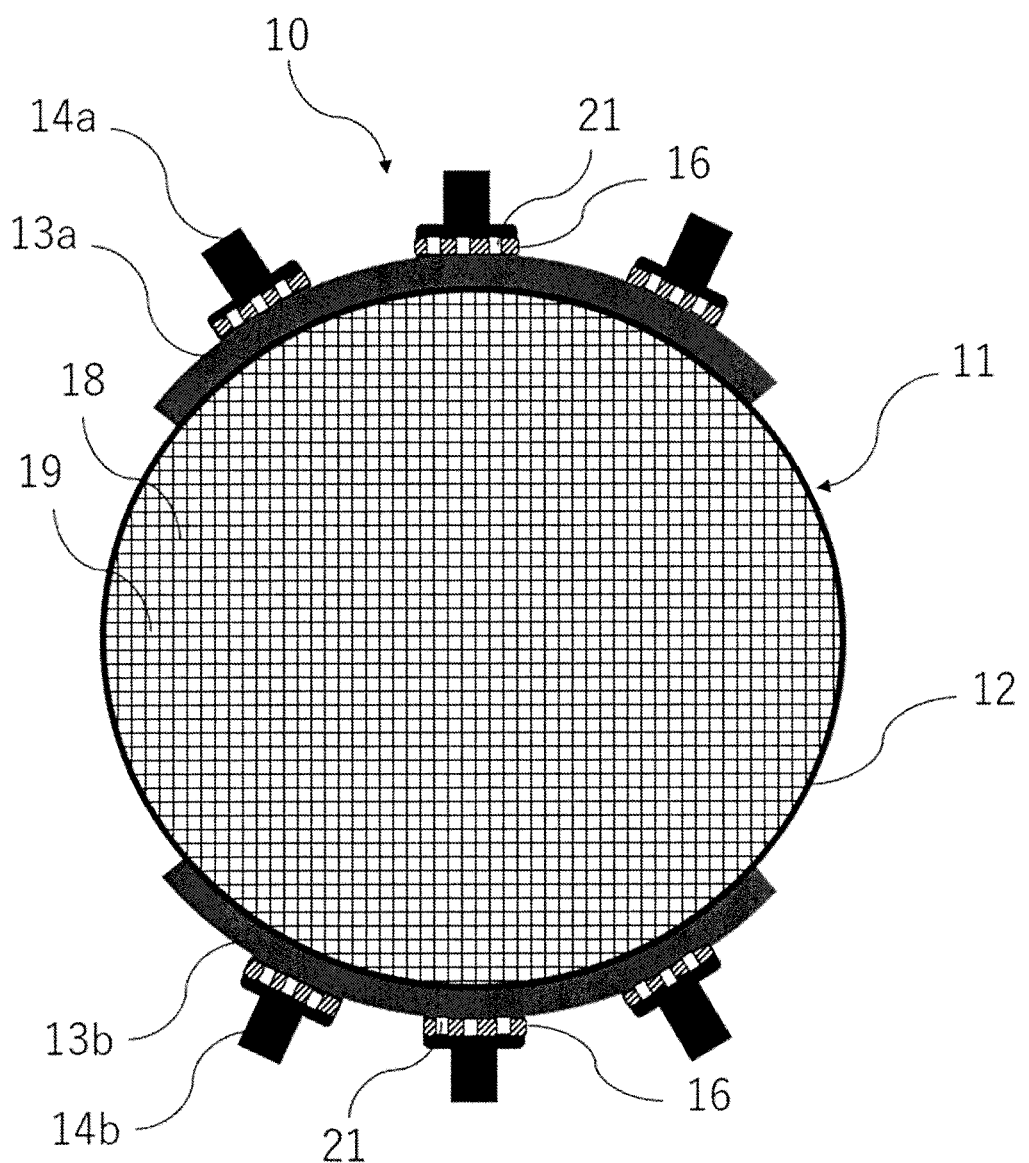
FIG. 1 is a schematic cross-sectional view of an electric heating type support according to Embodiment 1 of the present invention, which is perpendicular to an extending direction of cells.

Hereinafter, embodiments according to the present invention will be specifically described with reference to the drawings. It is to understand that the present invention is not limited to the following embodiments, and various design modifications and improvements may be made based on ordinary knowledge of one of ordinary skill in the art, without departing from the spirit of the present invention.

In order to avoid cracking or breakage at an interface between the electrode layer and the metal electrode, the honeycomb structure of Patent Literature 1 forms underlayers between the electrode layers and the metal electrodes in anticipation of a stress relaxation effect. However, when the underlayers are formed over the entire range where the metal electrodes are fixed, there are problems that a stress difference due to a temperature difference is generated between the underlayer with the metal electrode fixed and the underlayer with no metal electrode fixed, and that cracks are generated in the underlayers. Therefore, it is necessary to alleviate the temperature difference generated in the underlayers while maintaining a function of alleviating a thermal expansion difference as the underlayer.

In order to solve the above problems, the present inventors have considered a structure in which the underlayers are arranged in the form of spots between the electrode layers and the metal electrodes. According to the structure in which the underlayers are thus arranged in the form of spots as described above, a temperature difference generated in the underlayers can be alleviated and cracks in the underlayers can be suppressed. However, when the underlayers are formed in the form of spots, the heat generated during current conduction through the honeycomb structure does not spread in the underlayers, thereby leading to more easy conduction to the metal electrodes. This may cause more expansion of the metal electrodes having higher thermal expansion coefficient, and generate cracking or breakage at interfaces between the underlayers and the metal electrodes due to the expansion difference between the metal electrodes and the underlayers.

The present invention has been made in view of the above circumstances. An object of the present invention is to provide an electric heating type support and an exhaust gas purifying device, which can provide good suppression of a temperature difference generated in underlayers during current conduction, and also suppress cracks in the underlayers by providing good suppression of heat conduction to metal electrodes.

As a result of intensive studies, the present inventors have found that the above problems can be solved by creating a structure in which metal electrodes provided via two or more conductive underlayers spaced apart from each other are provided on electrode layers arranged on a surface of an outer peripheral wall of a pillar shaped honeycomb structure, and each of the underlayers has a concave portion forming a space between the metal electrode and the metal electrode, or the metal electrode has a concave portion forming a space on the underlayer side surface.

According to the present invention, it is possible to provide an electric heating type support and an exhaust gas purifying device, which can provide good suppression of a temperature difference generated in a underlayer during current conduction, and also suppress cracks in the underlayer by providing good suppression of heat conduction to metal electrodes.

Embodiment 1

(1. Electric Heating Type Support)

FIG. 1 is a schematic cross-sectional view of an electric heating type support 10 according to Embodiment 1 of the present invention, which is perpendicular to a cell extending direction. The electric heating type support 10 includes: a pillar shaped honeycomb structure 11; electrode layers 13*a*, 13*b* each disposed on a surface of an outer peripheral wall 12 of the pillar shaped honeycomb structure 11; two or more underlayers 16 provided on each of the electrode layers and spaced apart from each other; and metal electrodes 14*a*, 14*b*.

(1-1. Honeycomb Structure)

Figure 2:
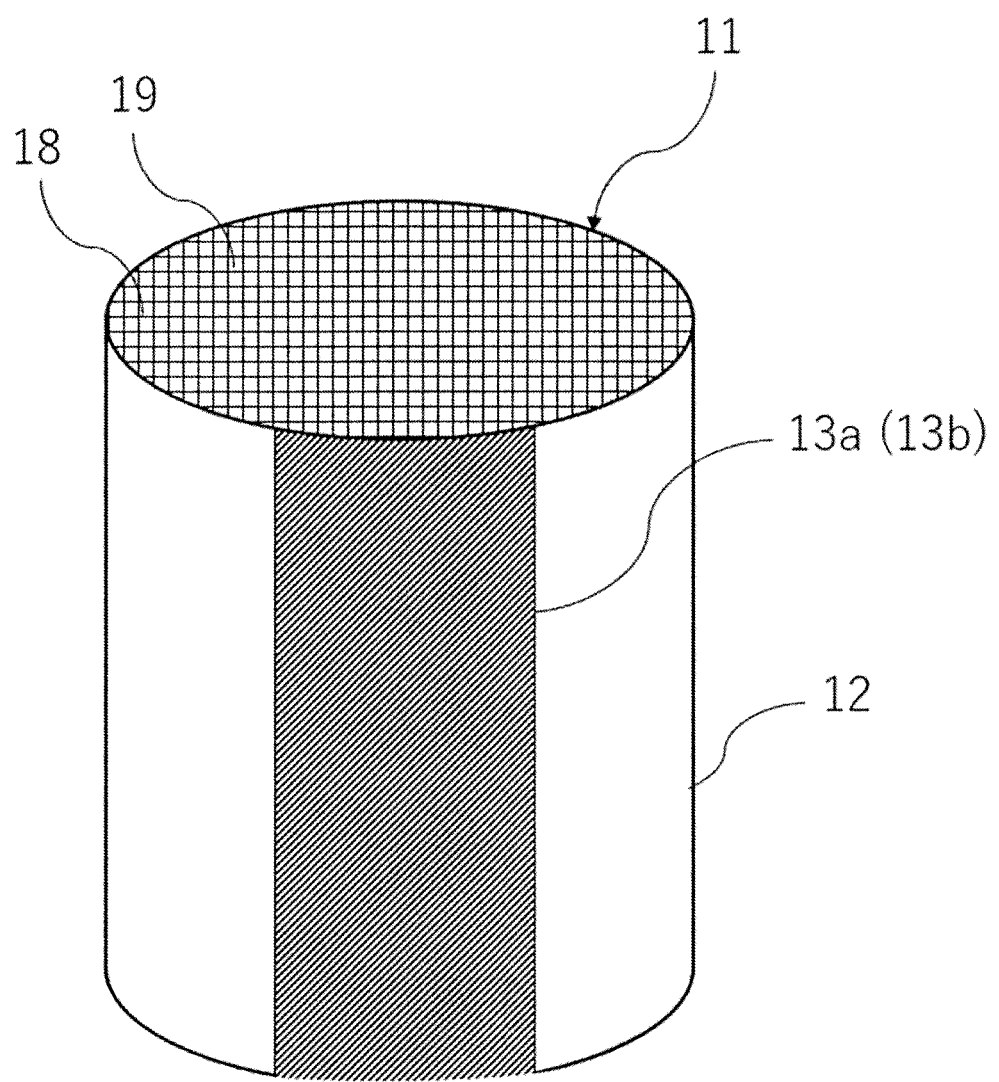
FIG. 2 is a schematic external view of a pillar shaped honeycomb structure and an electrode layer according to Embodiment 1 of the present invention.

FIG. 2 is a schematic external view of the pillar shaped honeycomb structure 11 and the electrode layers 13*a*, 13*b* according to Embodiment 1 of the present invention. The pillar shaped honeycomb structure 11 includes: an outer peripheral wall 12; and partition walls 19 which are disposed on an inner side of the outer peripheral wall 12 and define a plurality of cells 18 extending from one end face to other end face to form flow paths.

An outer shape of the pillar shaped honeycomb structure 11 is not particularly limited as long as it is pillar shaped. For example, the honeycomb structure can have a shape such as a pillar shape with circular end faces (circular pillar shape), a pillar shape with oval end faces and a pillar shape with polygonal (square, pentagonal, hexagonal, heptagonal, octagonal, etc.) end faces. The pillar shaped honeycomb structure 11 preferably has a size of the end face of from 2000 to 20000 mm$^2$, and more preferably from 5000 to 15000 mm$^2$, for the purpose of improving heat resistance (suppressing cracks entering the outer peripheral wall in a circumferential direction).

The pillar shaped honeycomb structure 11 is made of ceramics and has conductivity. Electrical resistivity of the ceramic is not particularly limited as long as the conductive pillar shaped honeycomb structure 11 can generate heat by Joule heat upon electrical conduction. The electrical resistivity is preferably from 1 to 200 Ωcm, and more preferably from 10 to 100 Ωcm. In the present invention, the electrical resistivity of the pillar shaped honeycomb structure 11 is a value measured at 400° C. by a four-terminal method.

A material of the pillar shaped honeycomb structure 11 can be selected from, but not limited to, oxide ceramics such as alumina, mullite, zirconia, and cordierite, and non-oxide ceramics such as silicon carbide, silicon nitride, and aluminum nitride. Further, a silicon carbide-metallic silicon composite material, a silicon carbide/graphite composite material, or the like can also be used. Among them, from the viewpoint of compatibility of heat resistance and conductivity, preferably, the material of the honeycomb structure 11 contains a ceramic mainly based on a silicon-silicon carbide composite material or silicon carbide. The phrase "the material of the honeycomb structure 11 is mainly based on a silicon-silicon carbide composite material" means that the pillar shaped honeycomb structure 11 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are preferably bonded by silicon so as to form pores between the silicon carbide particles. The phrase "the material of the pillar shaped honeycomb structure 11 is mainly based on silicon carbide" means that the pillar shaped honeycomb structure 11 contains 90% by mass or more of silicon carbide (total mass) based on the entire honeycomb structure.

When the pillar shaped honeycomb structure 11 contains the silicon-silicon carbide composite material, a ratio of a "mass of silicon as a bonding material" contained in the pillar shaped honeycomb structure 11 to the total of a "mass of silicon carbide particles as an aggregate" contained in the pillar shaped honeycomb structure 11 and a "mass of silicon as a bonding material" contained in the pillar shaped honeycomb structure 11 is preferably from 10 to 40% by mass, and more preferably from 15 to 35% by mass. When it is 10% by mass or more, the strength of the pillar shaped honeycomb structure 11 is sufficiently maintained. When it is 40% by mass or less, the shape is easily maintained during firing.

A shape of each cell in a cross section perpendicular to an extending direction of the cells 18 is not limited, but it is preferably a square, a hexagon, an octagon, or a combination thereof. Among these, the square and the hexagon are preferred. Such a cell shape can lead to a decreased pressure loss upon flowing of an exhaust gas through the pillar shaped honeycomb structure 11, resulting in improvement of purification performance of the catalyst. The square is particularly preferable in terms of easily achieving both structural strength and heating uniformity.

Each of the partition walls 19 forming the cells 18 preferably has a thickness of from 0.1 to 0.3 mm, and more preferably from 0.15 to 0.25 mm. The thickness of each partition wall 19 of 0.1 mm or more can suppress a decrease in the strength of the honeycomb structure. The thickness of each partition wall 19 of 0.3 mm or less can suppress an increase in pressure loss upon flowing of an exhaust gas, when the honeycomb structure is used as a catalyst support and a catalyst is supported thereon. In the present invention, the thickness of the partition wall 19 is defined as a length of a portion passing through the partition wall 19, among line segments connecting centers of gravity of the adjacent cells 18 in a cross section perpendicular to the extending direction of the cells 18.

The pillar shaped honeycomb structure 11 preferably has a cell density of from 40 to 150 cells/cm$^2$, and more preferably from 70 to 100 cells/cm$^2$, in a cross section perpendicular to a flow path direction of cells 18. The cell density in such a range can increase the purification performance of the catalyst while reducing the pressure loss upon flowing of an exhaust gas. The cell density of 40 cells/cm$^2$ or more can ensure a sufficient catalyst supporting area. The cell density of 150 cells/cm$^2$ or less can prevent a pressure loss upon flowing of an exhaust gas from being increased when the pillar shaped honeycomb structure 11 is used as a catalyst support and a catalyst is supported thereon. The cell density is a value obtained by dividing the number of cells by an area of one end face of the pillar shaped honeycomb structure 11 excluding the outer peripheral wall 12.

The provision of the outer peripheral wall 12 of the pillar shaped honeycomb structure 11 is useful in terms of ensuring the structural strength of the pillar shaped honeycomb structure 11 and preventing a fluid flowing through the cells 18 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall 12 and the partition wall 19 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a cell extending direction.

The partition walls 19 can be porous. A porosity of the partition wall 19 is preferably from 35 to 60%, and more preferably from 35 to 45%. The porosity of 35% or more can lead to more easy suppression of deformation during firing. The porosity of 60% or less can allow the strength of the honeycomb structure to be sufficiently maintained. The porosity is a value measured by a mercury porosimeter.

The partition walls 19 of the pillar shaped honeycomb structure 11 preferably have an average pore diameter of from 2 to 15 µm, and more preferably from 4 to 8 µm. The average pore diameter of 2 µm or more can prevent excessively high electric resistivity. The average pore diameter of 15 µm or less can prevent excessively low electric resistivity. The average pore diameter is a value measured by a mercury porosimeter.

A pair of electrode layers 13a, 13b are arranged on the surface of the outer peripheral wall 12 of the pillar shaped honeycomb structure 11. One electrode layer of the pair of electrode layers 13a, 13b is provided so as to face the other electrode layer of the pair of electrode layers 13a, 13b across a central axis of the pillar shaped honeycomb structure 11.

The electrode layers 13a, 13b may be formed in a non-limiting region. In terms of enhancing uniform heat generation of the pillar shaped honeycomb structure 11, each of the electrode layers 13a, 13b is preferably provided so as to extend in the form of belt in the circumferential direction and the cell extending direction. More particularly, It is desirable that each of the electrode layers 13a, 13b extends over a length of 80% or more, and preferably 90% or more, and more preferably the full length, between both end faces of the pillar shaped honeycomb structure 11, from the viewpoint that a current easily spreads in an axial direction of each of the electrode layers 13a, 13b.

Each of the electrode layers 13a, 13b preferably has a thickness of from 0.01 to 5 mm, and more preferably from 0.01 to 3 mm. Such a range can allow uniform heat generation to be enhanced. The thickness of each of the electrode layers 13a, 13b of 0.01 mm or more can lead to appropriate control of electric resistance, resulting in more uniform heat generation. The thickness of 5 mm or less can reduce a risk of breakage during canning. The thickness of each of the electrode layers 13a, 13b is defined as a thickness in a direction of a normal line to a tangential line at a measurement point on an outer surface of each of the electrode layers 13a, 13b when observing the point of each electrode layer to be subjected to thickness measurement in a cross section perpendicular to the cell extending direction.

The electric resistivity of each of the electrode layers 13a, 13b is lower than the electric resistivity of the pillar shaped honeycomb structure 11, whereby the electricity tends to flow preferentially to the electrode layers, and the electricity tends to spread in the cell flow path direction and the circumferential direction during electric conduction. The electric resistivity of the electrode layers 13a, 13b is preferably 1/10 or less, and more preferably 1/20 or less, and even more preferably 1/30 or less, of the electric resistivity of the pillar shaped honeycomb structure 11. However, if the difference in electric resistivity between both becomes too large, the current is concentrated between ends of the opposing electrode layers to bias the heat generated in the pillar shaped honeycomb structure portion. Therefore, the electric resistivity of the electrode layers 13a, 13b is preferably 1/200 or more, and more preferably 1/150 or more, and even more preferably 1/100 or more, of the electric resistivity of the pillar shaped honeycomb structure 11. In the present invention, the electric resistivity of the electrode layers 13a, 13b is a value measured at 400° C. by a four-terminal method.

Each of the electrode layers 13a, 13b may be made of a composite material of a metal and a conductive ceramic (cermet). Examples of the metal include a single metal of Cr, Fe, Co, Ni, Si or Ti, or an alloy containing at least one metal selected from the group consisting of those metals. Non-limiting examples of the conductive ceramic include silicon carbide (SiC), and metal compounds such as metal silicides such as tantalum silicide ($TaSi_2$) and chromium silicide ($CrSi_2$). Specific examples of the composite material of the metal and the conductive ceramic (cermet) include a composite material of metallic silicon and silicon carbide, a composite material of metallic silicide such as tantalum silicide and chromium silicide, metallic silicon and silicon carbide, and further a composite material containing, in addition to one or more metals listed above, one or more insulating ceramics such as alumina, mullite, zirconia, cordierite, silicon nitride, and aluminum nitride, in terms of decreased thermal expansion. As the material of the electrode layers 13a, 13b, among the various metals and conductive ceramics as described above, a combination of a metal silicide such as tantalum silicide and chromium silicide with a composite material of metallic silicon and silicon carbide is preferable, because it can be fired simultaneously with the pillar shaped honeycomb structure, which contributes to simplification of the producing steps.

(1-2. Underlayer)

Figure 3:
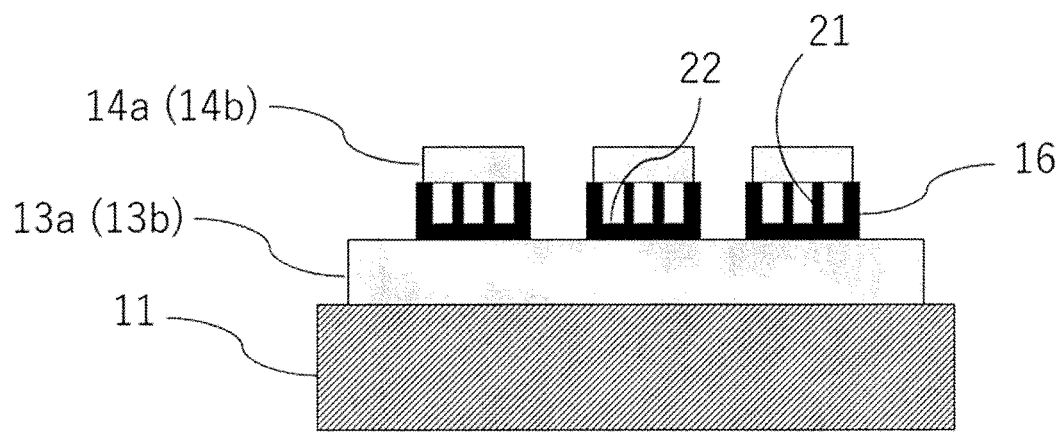
FIG. 3 is a schematic cross-sectional view of a pillar shaped honeycomb structure, an electrode layer, underlayers, and metal electrodes according to an embodiment of the present invention.

FIG. 3 shows a schematic cross-sectional view of the pillar shaped honeycomb structure 11, the electrode layer 13a, 13b, underlayers 16 and the metal electrode 14a, 14b according to Embodiment 1 of the present invention.

The electric heating type support 10 according to Embodiment 1 of the present invention is provided with two or more conductive underlayers 16 on each of the electrode layers 13a, 13b so as to be spaced apart from each other. Each underlayer 16 has conductivity. The underlayers 16 can be formed on the surfaces of the electrode layers 13a, 13b, and each of the underlayers 16 is formed in a substantially flat plate shape (specifically, a curved shape along an outer surface of the electrode layer 13a, 13b). Each underlayer 16 can be formed of a metal material (e.g., a NiCr-based material) having a thermal expansion coefficient between a thermal expansion coefficient of the electrode layer 13a, 13b (a linear expansion coefficient of the electrode layers 13a, 13b is relatively low) and a thermal expansion coefficient of the metal electrode 14a, 14b (a linear expansion coefficient of the metal electrode 14a, 14b is relatively high), and it has a function of absorbing a thermal expansion difference generated between the electrode layer 13a, 13b and the metal electrode 14a, 14b.

Figure 15:
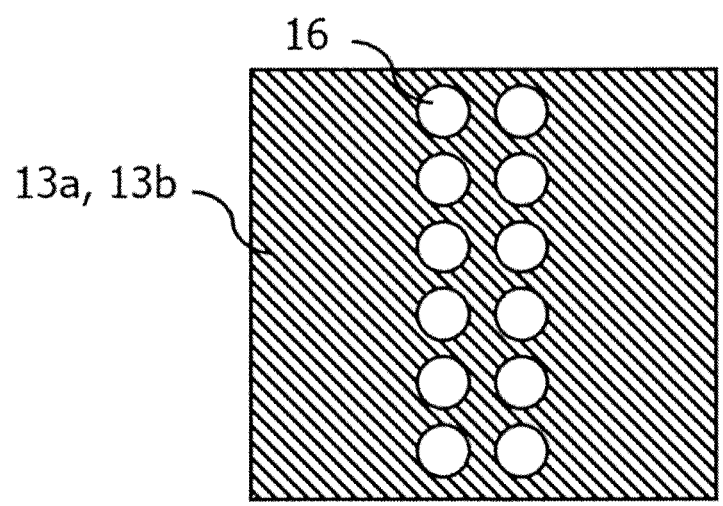
FIG. 15 is a schematic plan view showing an arrangement example of underlayers of an electric heating type support according to an embodiment of the present invention.
Figure 16:
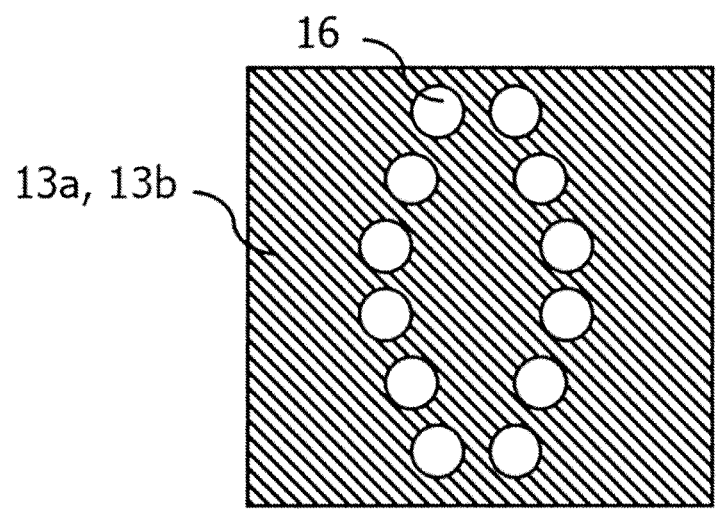
FIG. 16 is a schematic plan view showing an arrangement example of underlayers of an electric heating type support according to an embodiment of the present invention.
Figure 17:
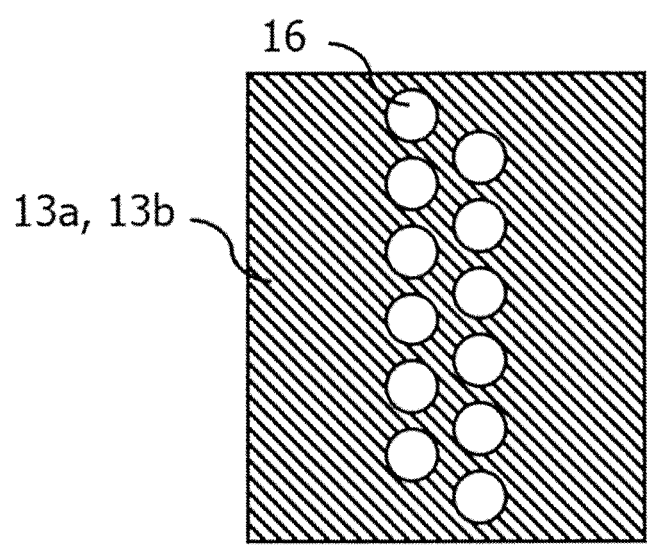
FIG. 17 is a schematic plan view showing an arrangement example of underlayers of an electric heating type support according to an embodiment of the present invention.

As described above, when the conventional underlayers are formed over the entire range where the metal electrode 14a, 14b is fixed, a temperature difference is generated between the underlayer on which the metal electrode 14a, 14b is fixed and the underlayer on which the metal electrode 14a, 14b is not fixed, and a stress difference due to the temperature difference causes a problem of generating cracks in the underlayers. Therefore, the provision of the underlayers 16 in the regions required for fixing the metal electrodes 14a, 14b, rather than formation of the underlayers on the entire region where the metal electrodes 14a, 14b are fixed, can allow the underlayers 16 to be spaced apart from each other, thereby alleviating the temperature difference between the underlayer 16 with the metal electrode 14a, 14b fixed and the underlayer 16 with no metal electrode 14a, 14b fixed, and enabling cracks in the underlayers 16 to be effectively suppressed. Although FIG. 1 shows an embodiment where three underlayers 16 are formed on the outer surface of the electrode layer 13a, 13b, three or more underlayers 16 may be formed so as to be spaced apart from each other. The number and arrangement of the electrodes are not limited, and they can be appropriately set within ranges required for fixing the metal electrodes 14a, 14b. Further, as a specific arrangement example of the underlayers 16, two rows of underlayer groups each configured to linearly arrange six underlayers at equal intervals so as to extend in the extending direction of the pillar shaped honeycomb structure 11 may be provided in parallel, as shown in FIG. 15. Furthermore, as shown in FIG. 16, two rows of the underlayer groups each configured to arrange six underlayers 16 are provided, in which the underlayer groups of the two rows may be arranged in a curved shape, respectively, such that they are most distant from each other in the center. Moreover, as shown in FIG. 17, two rows of the underlayer groups each configured to linearly arrange six underlayers at equal intervals are provided in parallel, in which the underlayers 16 in one underlayer group and the adjacent underlayers 16 in the other underlayer group, which stand in parallel to the former underlayers, respectively, may be placed in positions shifted to each other from the directly horizontal direction. Although FIGS. 15 to 17 show that each underlying layer 16 is formed in a circular shape in each of the schematic plan views, the shape is not particularly limited, and each underlayer 16 can be formed in any shape such as an elliptical shape and a polygonal shape.

However, only providing of the underlayers on the metal electrodes 14a, 14b so as to be spaced apart from each other, heat is excessively transferred from the underlayers to the metal electrodes when conducting a current through the electric heating type support 10. This causes more expansion of the metal electrodes 14a, 14b having a higher thermal expansion coefficient, whereby, due to a difference between expansions of the underlayers and the metal electrodes 14a, 14b, destruction occurs at the interface between the underlayer and the metal electrode 14a, 14b. Therefore, in the electric heating type support 10 according to Embodiment 1 of the present invention, a surface of each underlayer 16 further has concave portions 21 each forming a space between the underlayer and the metal electrode 14a, 14b. Such a structure can provide a decreased contact area between the underlayer 16 and the metal electrode 14a, 14b, which can suppress the heat conduction from the underlayers 16 to the metal electrodes 14a, 14b, thereby suppressing the excessive heat transfer from the underlayers 16 to the metal electrodes 14a, 14b. This can allow an amount of thermal expansion of the metal electrodes 14a, 14b due to heat generation during current conduction to be decreased to suppress the destruction at the interface between each metal electrode 14a, 14b and each underlying layer 16. Further, this can allow the stress generated in the underlayers 16 themselves to be relieved to suppress generation of cracks in the underlayers 16 due to heat generation during current conduction.

Each concave portion 21 may be a groove portion 22 parallelly extending in a plane direction of the underlayer 16. In the embodiment shown in FIG. 3, each groove portion 22 has a rectangular shape in a cross section perpendicular to the extending direction of the groove portion 22. Further, the groove portion 22 may have any shape such as a linear shape, a parabolic shape, or a shape that extends while bending, when the underlying layer 16 is viewed in a plan view.

Figure 4:
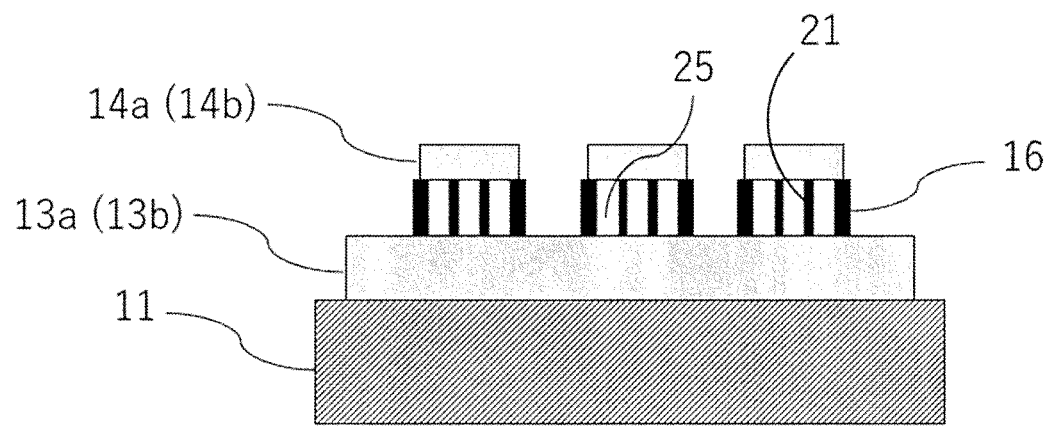
FIG. 4 is a schematic cross-sectional view of a pillar shaped honeycomb structure, an electrode layer, underlayers, and metal electrodes according to another embodiment of the present invention.

Each concave portion 21 may penetrate through the underlayer 16 in the cross-sectional direction of the underlayer 16. FIG. 4 illustrates an embodiment where each groove portion 25 penetrating in the cross-sectional direction of the underlayer 16 forms each concave portion 21. When each concave portion 21 is each groove portion 25 penetrating in the cross-sectional direction of the underlayer 16, the heat conduction from the underlayers 16 to the metal electrodes 14a, 14b can be further suppressed.

Figure 5:
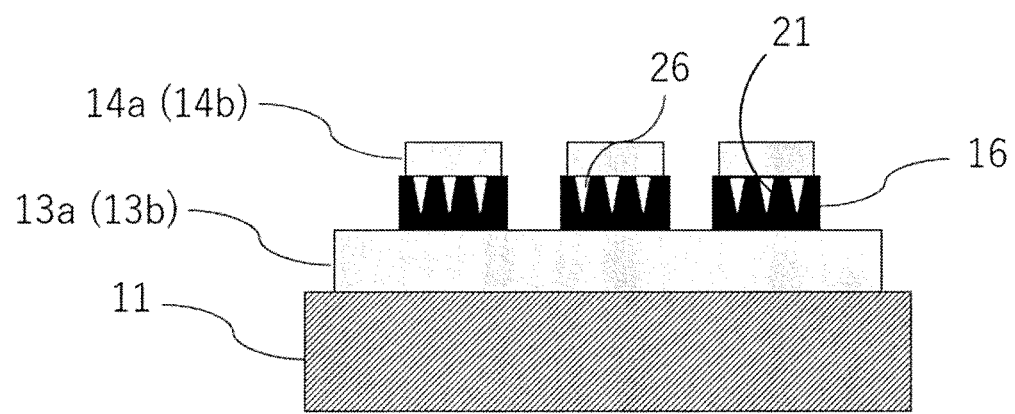
FIG. 5 is a schematic cross-sectional view of a pillar shaped honeycomb structure, an electrode layer, underlayers and metal electrodes according to still another embodiment of the present invention.
Figure 6:
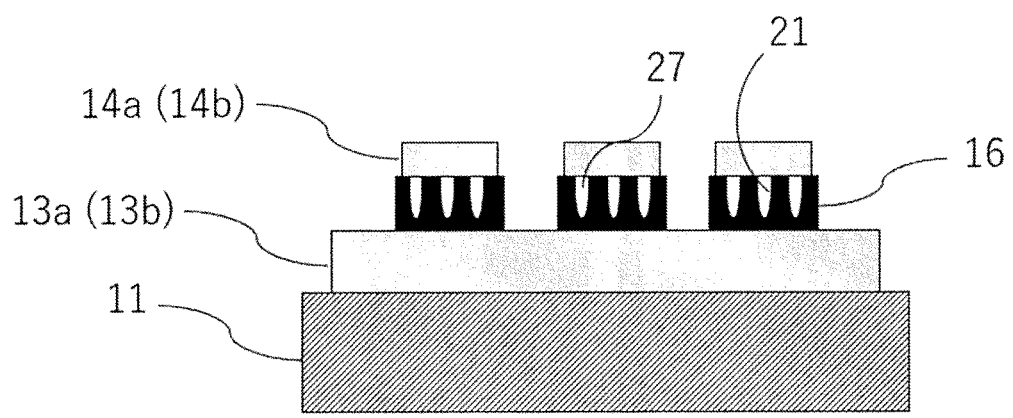
FIG. 6 is a schematic cross-sectional view of a pillar shaped honeycomb structure, an electrode layer, underlayers and metal electrodes according to still another embodiment of the present invention.

Each groove portion 22 may have a V shape in the cross section perpendicular to the extending direction of the groove portion. FIG. 5 illustrates an embodiment where each V-shaped groove portion 26 forms each concave portion 21. Further, each groove portion 22 may have a U-shape in the cross section perpendicular to the extending direction of the groove portion. FIG. 6 illustrates an embodiment where the U-shaped groove 27 forms the concave portion 21.

Figure 7:
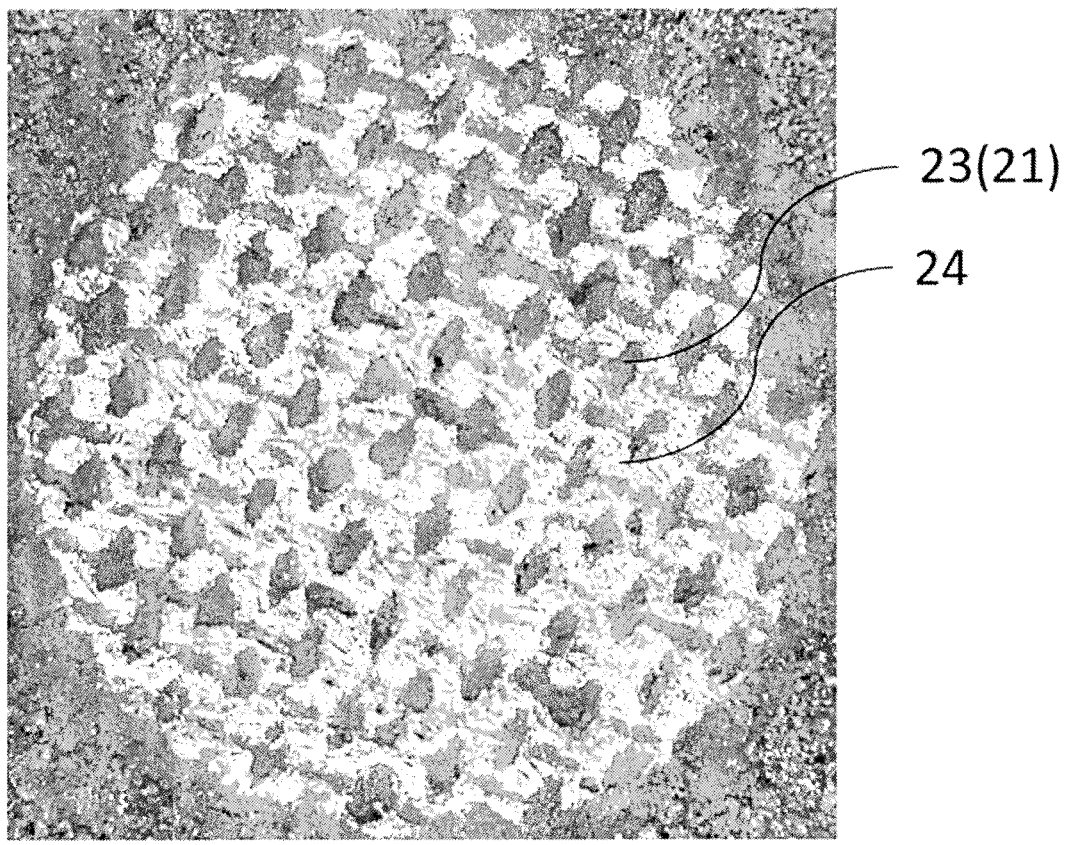
FIG. 7 is a surface observation photograph of underlayers having concave-convex regions provided in a mesh shape.

The underlayer 16 may have concave-convex regions (concave regions 23 and convex regions 24) provided in a mesh shape on the surface on the side of the metal electrode 14a, 14b, and the concave portions 21 may be the concave regions 23 in the concave-convex regions. FIG. 7 shows a surface observation photograph of the underlayer having the concave-convex regions provided in a mesh shape. In the present invention, the mesh shape can also be referred to as a net shape. That is, as used herein, the structure having the concave-convex regions provided in a mesh shape may mean that the underlayer 16 is formed in a mesh shape so that the regions where the underlayers 16 are present (convex regions) and the regions where no underlying layer 16 is present like holes (concave regions) are arranged substantially alternately (for example, in a zigzag pattern).

An area ratio of the contact surface of the underlayers 16 with the metal electrode 14a, 14b is preferably from 40 to 85% relative to the surfaces of the underlayers 16 on the metal electrode 14a, 14b side. The area ratio of the contact surface of the underlayers 16 with the metal electrode 14a, 14b of 40% or more relative to the surfaces of the underlayers 16 on the metal electrode 14a, 14b side can provide better joining strength of the underlayers 16 to the metal electrodes 14a, 14b, and the area ratio of 85% or less can provide better suppression of breakage inside the underlayers 16 due to the stress based on the expansion of the metal electrodes 14a, 14b. The area ratio of the contact surface of the underlayers 16 with the metal electrode 14a, 14b is more preferably 40 to 70%, and even more preferably 50 to 70%, relative to the surfaces of the underlayers 16 on the metal electrode 14a, 14b side.

The size of the space between the underlayer 16 and the metal electrode 14a, 14b formed by each concave portion 21 is not particularly limited, and may be designed as needed depending on the desired contact area between the underlayers 16 and the metal electrodes 14a, 14b. Further, it is sufficient to have the concave portions 21 (it is sufficient to have the space between the underlayer 16 and the metal electrode 14a, 14b). A certain amount of a metal material forming the metal electrodes may also enter into the groove portions 22, 25, 26 and 27.

The planar shape of the underlayer 16 is not particularly limited as long as the underlayers 16 are formed over the ranges required for fixing the metal electrodes 14a, 14b, and they are formed in the required area in the relation to the desired area ratio of the contact surface with the metal electrode 14a, 14b. In terms of productivity and practicality, the planar shape is preferably circular or rectangular.

Figure 8:
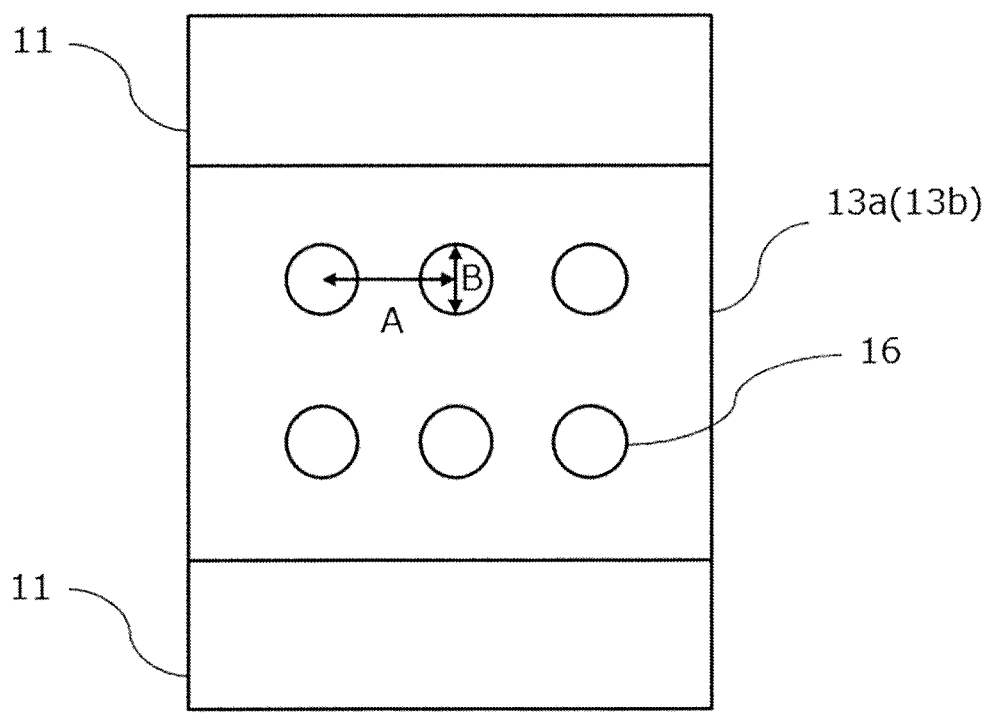
FIG. 8 is a view showing an arrangement of underlayers according to an embodiment of the present invention.

FIG. 8 is a view showing the structure on the outer peripheral surface of the electric heating type support 10 in the cell extending direction of the electric heating type support 10. Further, for the sake of explanation, the metal electrodes 14a, 14b are not shown. When the outer shape of the underlayer 16 is a circle having a diameter B on the projection plane perpendicular to the plane direction of the underlayer 16, a pitch A between the underlayers 16 and a diameter B of each underlayer 16 preferably fulfill a relationship: B/A≤0.9. Here, the pitch A between the underlayers 16 refers to a distance between circle centers of the adjacent underlayers 16. The ratio B/A of 0.9 or less can allow the underlayers 16 to be sufficiently separated from each other, so that the temperature difference between the underlayer 16 with the metal electrode 14a, 14b fixed and the underlayer 16 with no metal electrode 14a, 14b fixed is further alleviated. From this viewpoint, the ratio B/A is more preferably 0.7 or less.

Figure 9:
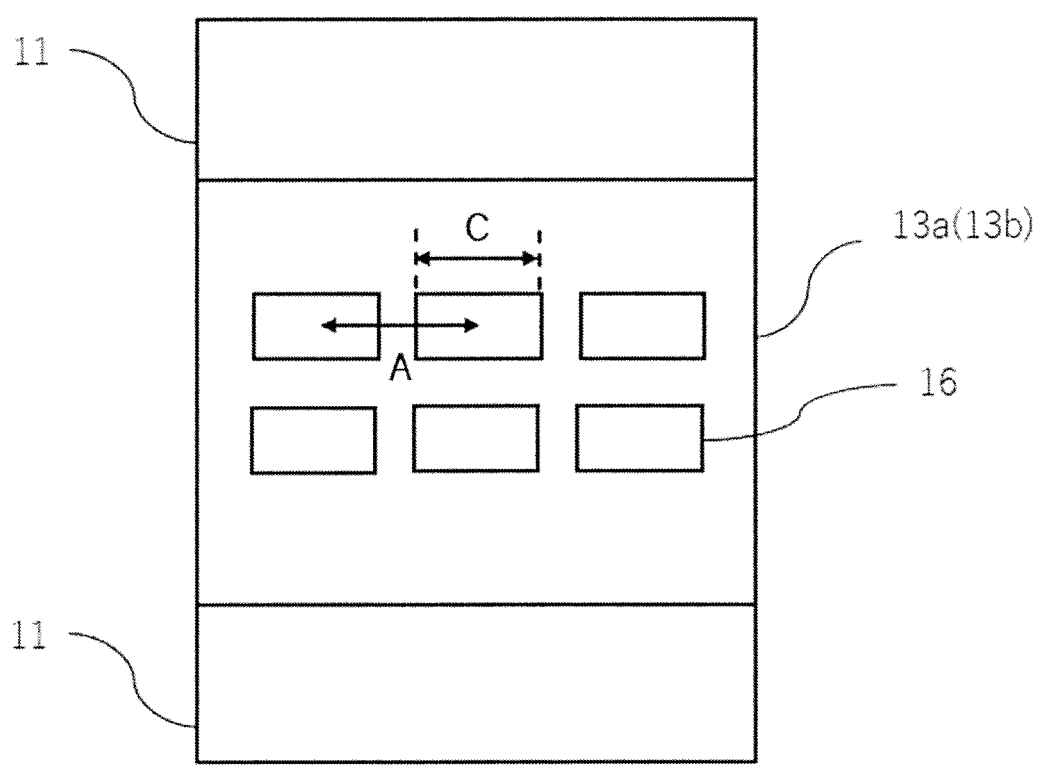
FIG. 9 is a view showing an arrangement of underlayers according to another embodiment of the present invention.

FIG. 9 shows a shape of the underlayer 16 deformed into a rectangle shape from the embodiment shown in FIG. 8. When the outer shape of each underlayer 16 is a rectangle shape having a long side C on the projection plane perpendicular to the plane direction of the underlayer 16, a pitch A between the underlayers 16 and the long side C of each underlayer 16 preferably fulfill a relationship: C/A≤0.9. Here, the pitch A between the underlayers 16 refers to a distance between intersections of diagonal lines of the adjacent underlayers 16. The ratio C/A of 0.9 or less can allow the underlayers 16 to be sufficiently separated from each other, so that the temperature difference between the underlayer 16 with the metal electrode 14a, 14b fixed and the underlayer 16 with no metal electrode 14a, 14b fixed can be further alleviated. From this viewpoint, the ratio C/A is more preferably 0.7 or less.

Further, the thickness of each underlayer 16 can be set such that the reduction of thermal stress between the electrode layer 13a, 13b and the electrode portion 15 and the conduction efficiency are compatible with each other.

As will be described later, when the metal electrodes 14a, 14b are fixed to the outer surfaces of the underlayers 16 by fixing layers 17, each underlayer preferably has a surface roughness Ra of 3 μm or more, in terms of obtaining the joining strength between the fixing layer 17 and the underlayer 16.

The underlayers 16 can be formed by preparing an underlayer forming paste as follows, applying the underlayer forming paste onto the electrode layers of the pillar shaped honeycomb structure by means of a curved surface printing machine or the like to form coated films, and firing the coated films. The underlayer forming paste can be formed by firstly mixing metal powder (metal powder such as a NiCr-based material and stainless steel) and oxide powder (oxide powder such as Cd, alumina, and mullite) in a volume ratio of the metal of from 20 to 85 vol. % and oxide powder of 15 to 80 vol. % to prepare a ceramic raw material, and then adding to the ceramic raw material 1% by mass of a binder, 1% by mass of a surfactant and from 20 to 40% by mass of water to form the underlayer forming paste.

(1-3. Metal Electrode)

The metal electrodes 14a, 14b are provided via the two or more conductive underlayers and are electrically joined, respectively. The metal electrodes 14a, 14b may be a pair of metal electrodes arranged such that one metal electrode 14a faces the other metal electrode 14b across the central axis of the pillar shaped honeycomb structure 11. As a voltage is applied to the metal electrodes 14a, 14b through the electrode layers 13a, 13b, a current can be conducted through the metal electrodes 14a, 14b to heat the pillar shaped honeycomb structure 11 by Joule heat. Therefore, the electric heating type support 10 can be suitably used as a heater. The applied voltage is preferably from 12 to 900 V, and more preferably from 64 to 600 V, although the applied voltage may be varied as needed.

The material of the metal electrodes 14a, 14b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal electrodes 14a, 14b are not particularly limited, and they can be appropriately designed according to the size of the electric heating type support 10, the electrical conduction performance, and the like.

The metal electrode 14a, 14b may have two or more electrode portions 15. Each electrode portion 15 is fixed to the outer surfaces of the underlayers 16. Here, each electrode portion 15 may be fixed to the underlayers 16 by welding, or may be fixed to the underlayers 16 by the fixing layers 17 formed by thermal spraying as described later (see FIG. 11).

Figure 10:
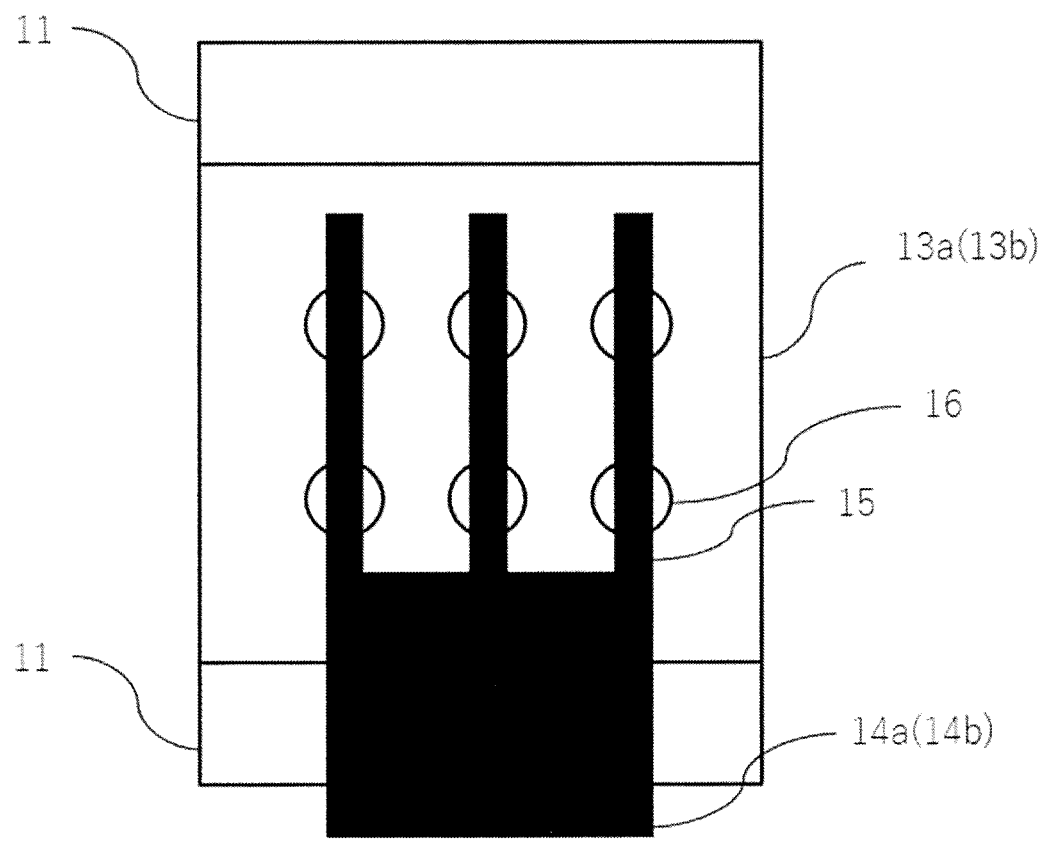
FIG. 10 is a view showing a fixed state of electrode portions according to an embodiment of the present invention.

In the embodiment shown in FIG. 10, each of the metal electrodes 14a, 14b has three comb-shaped electrode portions 15, and each electrode portion 15 is fixed to two underlayers 16. Thus, the electrical connection between the comb-shaped electrode portion 15 and the electrode layer 13a, 13b is achieved by the two or more underlayers 16 provided so as to be spaced apart from each other.

Figure 11:
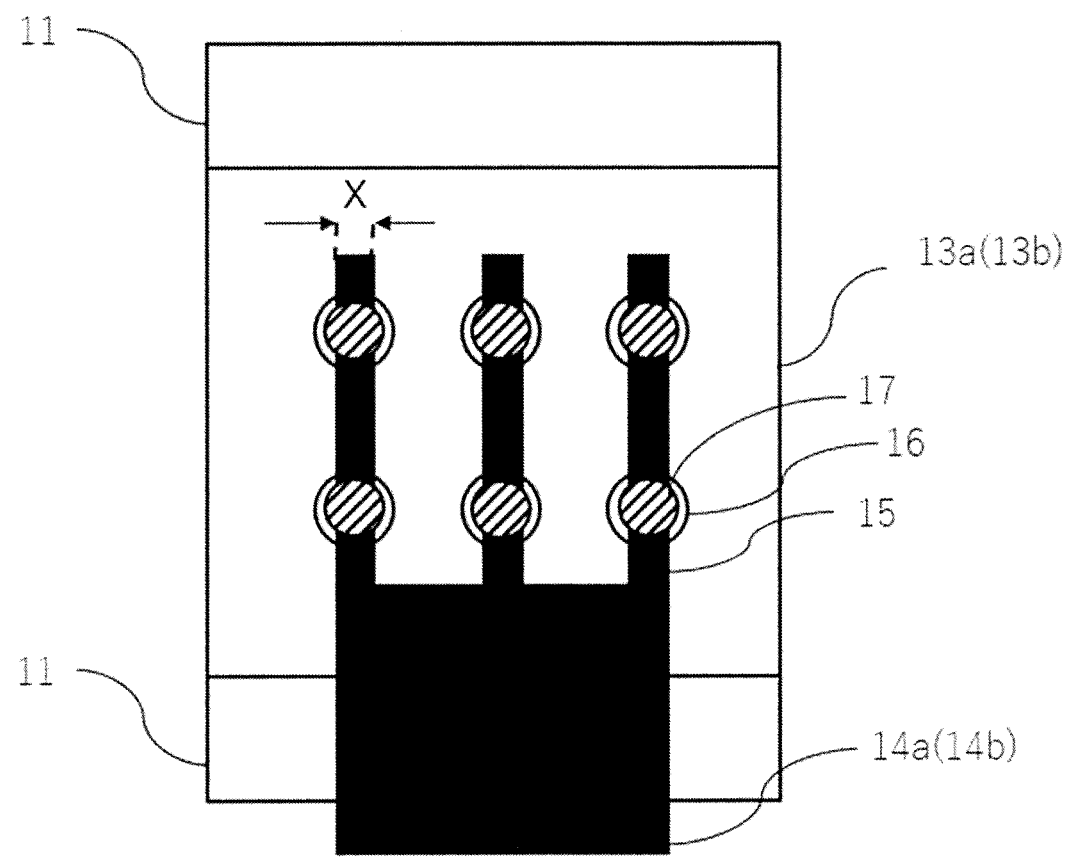
FIG. 11 is a view showing a fixed state of electrode portions according to another embodiment of the present invention.

Although each electrode portion 15 is formed in the comb shape in FIGS. 10 and 11, any shape can be adopted as long as it can be fixed to the underlayers 16 and can be electrically connected to the electrode layer 13a, 13b.

(1-4. Fixing Layer)

The electrode portions 15 of the metal electrodes 14a, 14b may be fixed to the outer surfaces of the underlayers 16 by the fixing layers 17, as shown in FIG. 11. Each fixing layer 17 is joined to both the electrode portion 15 of the metal electrode 14a, 14b and the underlayers 16. As a result, the electrode layers 13a, 13b are electrically joined to the metal electrodes 14a, 14b, respectively. In this case, since electricity can be conducted through the fixing layers 17, the electrode portions 15 of the metal electrodes 14a, 14b do not have to be in direct contact with the underlayers 16.

Each fixing layer 17 is made of a metal material (for example, a NiCr-based material or a CoNiCr-based material) having a thermal expansion coefficient between a thermal expansion coefficient of the metal electrode 14a, 14b and the thermal expansion coefficient of the underlayer 16. Each fixing layer 17 has conductivity. The fixing layers 17 are provided so as to be scattered at a plurality of points on the surfaces of the comb-shaped electrode portions 15 and the underlayers 16, and are locally bonded to the comb-shaped electrode portions 15 and the underlayers 16. Further, in the embodiment of FIG. 11, the surface area of each fixing layer 17 is smaller than that of each underlayer 16.

Each of the fixing layers 17 is formed in a hemispherical shape on the surfaces of the comb-shaped electrode portion 15 and the underlayer 16. Each fixing layer 17 has a diameter larger than a line width X of each comb-shaped electrode portion 15. Each apex of each fixing layer 17 is located on a center line of each comb-shaped electrode portion 15, and is formed such that the comb-shaped electrode portion 15 is connected to surface sites of each underlayer 16, which are located on both sides of the underlayer 16 across the comb-shaped electrode portion 15 in the direction orthogonal to the longitudinal direction of the comb-shaped electrode portion 15. That is, each fixing layer 17 is bonded to both the comb-shaped electrode portion 15 and the surface sites of the underlayer 16, which are located on the both sides of the underlayer 16 across the comb-shaped electrode portion 15 in the direction orthogonal to the longitudinal direction of the comb-shaped electrode portion 15.

Both of the side surfaces facing the direction orthogonal to the longitudinal direction of the comb-shaped electrode portion 15 are covered with the fixing layer 17. The connection of each fixing layer 17 to each comb-shaped electrode portion 15 and each underlayer 16 is achieved by thermal-spraying the fixing layer 17 from above the metal electrode 14a, 14b placed on the underlayer 16 toward the center of the comb-shaped electrode portion 15.

A plurality of fixing layers 17 (two in FIG. 11) are provided per one comb-shaped electrode portion 15 of the metal electrode 14a, 14b, and are arranged at positions spaced apart from each other. The comb-shaped electrode portions 15 are locally bonded to the fixing layers 17 at a plurality of positions spaced apart from each other, respectively. The comb-shaped electrode portions 15 are fixed to the electrode layers 13a, 13b by locally fixing the fixing layers 17 to the comb-shaped electrode portions 15 and the underlayers 16 at a plurality of positions spaced apart from each other. In the comb-shaped electrode portions 15 adjacent to each other arranged in the axial direction of the electrode layer 13a, 13b, each fixing layer 17 is arranged at an oblique position on the surface of each underlayer 16. In the embodiment having the fixing layers 17, the other configurations of the electric heating type catalyst support are also common to the embodiments as discussed above.

By supporting the catalyst on the electric heating type support 10, the electric heating type support 10 can be used as a catalyst. For example, a fluid such as an exhaust gas from a motor vehicle can flow through the flow paths of the plurality of cells 18. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a $NO_x$ storage reduction catalyst (LNT catalyst) containing an alkaline earth metal and platinum as storage components for nitrogen oxides ($NO_x$). Illustrative examples of a catalyst that does not use the noble metal include a $NO_x$ selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(2. Method for Producing Electric Heating Type Support)

A method for producing the electric heating type support 10 according to the present invention will now be illustratively described. In an embodiment, the method for producing the electric heating type support 10 according to the present invention includes: a step A1 of obtaining an unfired honeycomb structure portion with an electrode layer forming paste; a step A2 of firing the unfired honeycomb structure portion with the electrode layer forming paste to form a pillar shaped honeycomb structure; and a step A3 of welding the metal electrodes to the pillar shaped honeycomb structure.

The step A1 is to prepare a honeycomb formed body that is a precursor of the honeycomb structure portion, and apply an electrode layer forming paste to a side surface of the honeycomb formed body to obtain an unfired honeycomb structure portion with the electrode layer forming paste. The preparation of the honeycomb formed body can be carried out in accordance with a method for preparing a honeycomb formed body in a known method for producing a honeycomb structure portion. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 μm, and more preferably from 3 to 40 μm. The average particle diameter of the metallic silicon (the metallic silicon powder) is preferably from 2 to 35 μm. The average particle diameter of each of the silicon carbide particles and the metallic silicon (metallic silicon particles) refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure portion is the silicon-silicon carbide composite material. In the case where the material of the honeycomb structure portion is silicon carbide, no metallic silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 μm. If the average particle diameter is less than 10 μm, pores may not be sufficiently formed. If the average particle diameter is more than 30 μm, a die may be clogged during forming. The average particle diameter of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure. In extrusion molding, a die having a desired overall shape, cell shape, partition wall thickness, cell density and the like can be used. Preferably, the resulting honeycomb structure is then dried. When the length in the central axis direction of the honeycomb structure is not the desired length, both the end faces of the honeycomb structure can be cut to the desired length. The honeycomb structure after drying is referred to as a honeycomb dried body.

The electrode layer forming paste for forming electrode layers is then prepared. The electrode layer forming paste can be formed by appropriately adding and kneading various additives to raw material powder (metal powder, ceramic powder, and the like) formulated according to required characteristics of the electrode layers. When one forms each electrode layer as a laminated structure, the joining strength between each metal terminal and each electrode layer tends to be improved by increasing an average particle diameter of the metal powder in the past for the second electrode layer, as compared with an average particle diameter of the metal powder in the paste for the first electrode layer. The average particle diameter of the metal powder refers to an arithmetic average diameter on volume basis when frequency distribution of the particle diameter is measured by the laser diffraction method.

The resulting electrode layer forming paste is applied to the side surface of the honeycomb formed body (typically, the honeycomb dried body) to obtain an unfired honeycomb structure portion with an electrode layer forming paste. The method for preparing the electrode layer forming paste and the method for applying the electrode layer forming paste to the honeycomb formed body can be performed according to a known method for producing a honeycomb structure. However, in order to achieve lower electrical resistivity, it is possible to increase a metal content ratio or to decrease the particle diameter of the metal particles as compared with the honeycomb structure portion.

As a variation of the method for producing the pillar shaped honeycomb structure, in the step A1, the honeycomb formed body may be temporarily fired before applying the electrode layer forming paste. That is, in this variation, the honeycomb formed body is fired to produce a honeycomb fired body, and the electrode fired paste is applied to the honeycomb fired body.

In the step A2, the unfired honeycomb structure portion with the electrode layer forming paste is fired to obtain a pillar shaped honeycomb structure. Prior to firing, the unfired honeycomb structure with the electrode layer forming paste may be dried. Also, prior to firing, degreasing may be carried out to remove the binder and the like. As the firing conditions, the unfired honeycomb structure is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

In the step A3, the surfaces of the electrode layers on the pillar shaped honeycomb structure are coated with a paste of a conductive material so as to have a predetermined arrangement by means of a curved surface printing machine or the like, dried, and then fired to form two or more underlayers spaced apart from each other. Further, each underlayer may be formed by spraying a conductive material so as to have a predetermined arrangement and shape.

As an example of forming the concave portions of the underlayers, a method of forming groove portions each extending in parallel to the plane direction of the underlayer and a method of forming concavo-convex regions provided in a mesh shape will be described with reference to the drawings.

Figure 13:
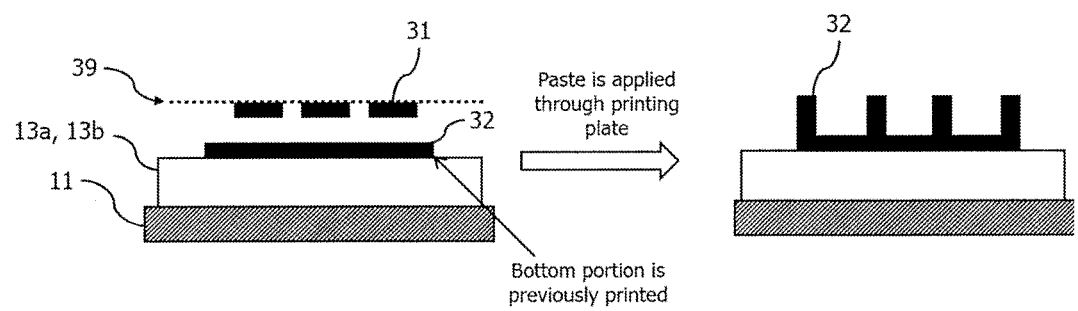
FIG. 13 is a schematic cross-sectional view for explaining a method of forming groove portions of an underlayer of an electric heating type support according to an embodiment of the present invention, which is perpendicular to an extending direction of a pillar shaped honeycomb structure.

FIG. 13 is a schematic cross-sectional view for explaining the method of forming the groove portions of the underlayers of the electric heating type support according to an embodiment of the present invention, which is perpendicular to the extending direction of the pillar shaped honeycomb structure. Ranges of printing plate 39 used in the above curved surface printing, through which a paste 32 passes, are provided with plugged parts 31 such that the paste 32 does not partially pass, whereby groove portions (concave portions) can be formed in the underlayers, with passing portions being the convex portions and non-passing portions being the concave portions.

Figure 14:
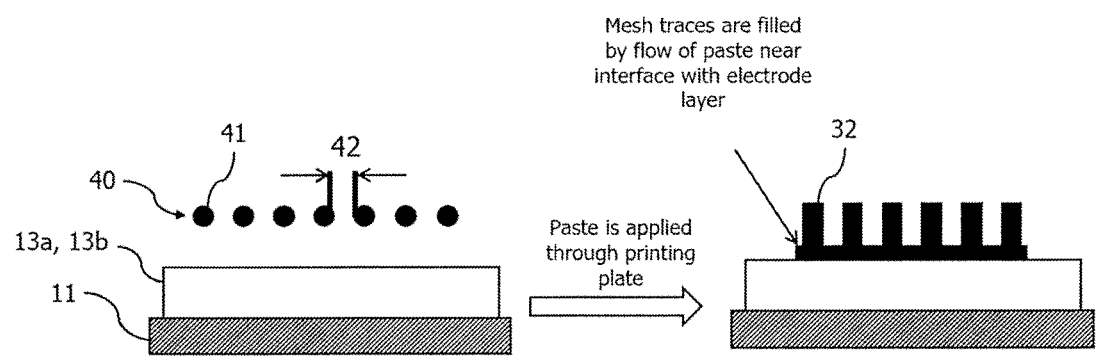
FIG. 14 is a schematic cross-sectional view for explaining a method of forming concave-convex regions provided in a mesh shape in an underlayer of an electric heating type support according to an embodiment of the present invention, which is perpendicular to an extending direction of a pillar shaped honeycomb structure.

FIG. 14 is a schematic cross-sectional view for explaining the method of forming the concave-convex regions provided in the mesh shape in the underlayers of the electric heating type support according to an embodiment of the present invention, which is perpendicular to the extending direction of the pillar shaped honeycomb structure. When the underlayers are formed by the above curved surface printing machine, a paste 32 passes through a mesh-shaped printing plate 40 with knitted fine wires 41, so that the paste 32 passes through openings 42 of the mesh to form convex regions, and the paste 32 does not pass through the mesh portions to form concave regions. The concavo-convex regions provided in the mesh shape in the underlayers can be thus formed.

The metal electrodes are then fixed by welding or thermal spraying onto the two or more underlayers spaced apart from each other. Methods of welding and thermal spraying are described in detail below. As the welding method, a laser welding method is preferable in terms of control of welded areas and production efficiency.

Examples of the fixing method by thermal spraying include a method of arranging the comb-shaped electrodes on the pillar shaped honeycomb structure with the underlayers formed, placing a spraying mask having holes on the honeycomb structure so as to match positions of the respective underlayers, thermal-spraying a spraying material from above the spraying mask such that the surface is covered so as to thermal-spray the spraying material only on the underlayers to deposit the spraying material, thereby forming fixing layers. By the fixing layer, each electrode layer of the comb-shaped electrode is fixed to the outer surface of the underlayer. Since each electrode portion is electrically connected to the underlayers, each fixing layer does not have to be in direct contact with each electrode and each underlayer. Examples of the thermal spraying material include a mixed thermal spray material of NiCrAlY and mullite.

Examples of the fixing method by welding include a method of arranging the comb-shaped electrodes on each honeycomb structure with a plurality of underlayers formed, and carrying out laser welding on portions where each comb-shaped electrode and the underlayers overlap with each other. A laser spot diameter for laser welding may be in a range of from 0.5 to 3.0 mm.

Embodiment 2

Figure 12:
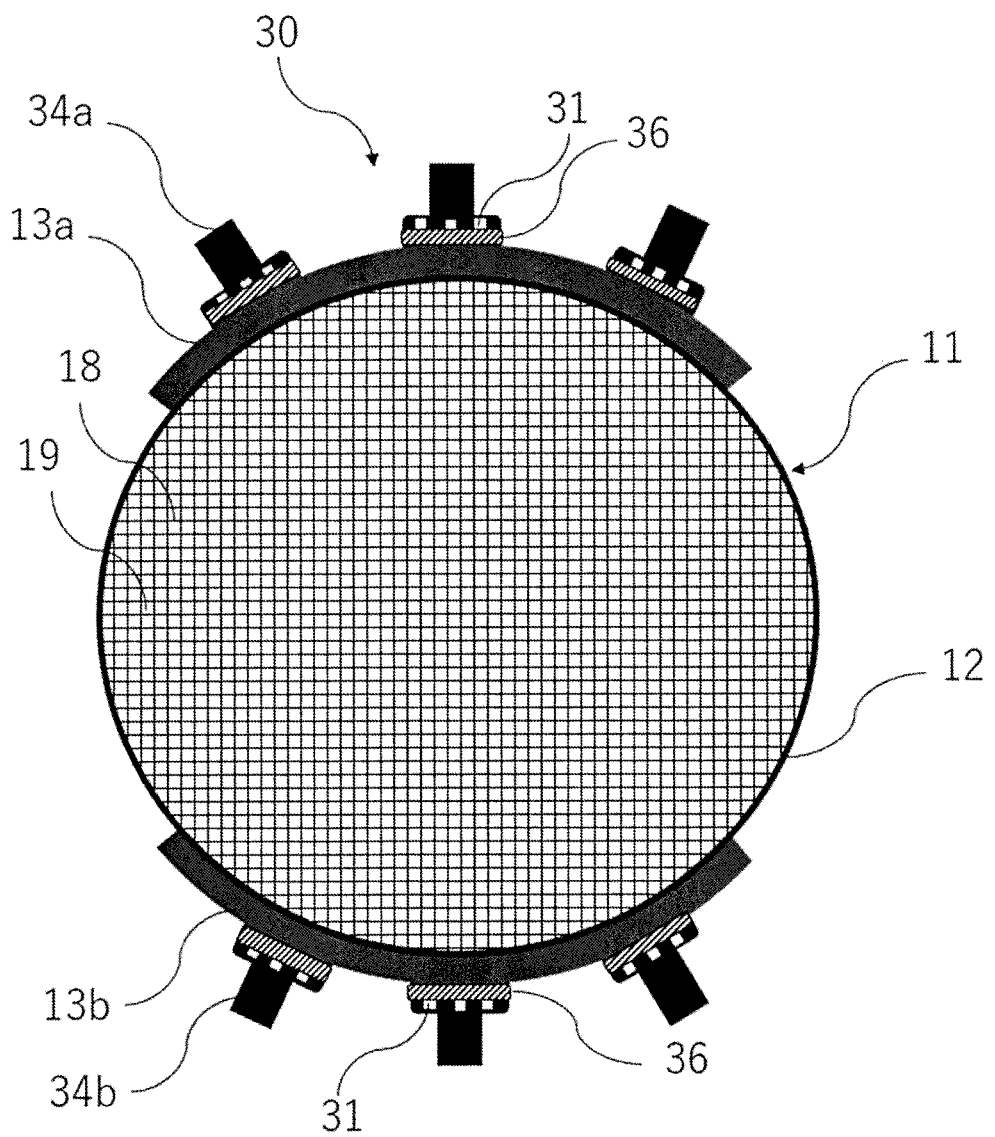
FIG. 12 is a schematic cross-sectional view of an electric heating type support according to Embodiment 2 of the present invention, which is perpendicular to an extending direction of cells.

FIG. 12 is a schematic cross-sectional view of an electric heating type support 30 according to Embodiment 2 of the present invention, which is perpendicular to the cell extending direction. The electric heating type support 30 includes: a pillar shaped honeycomb structure 11; electrode layers 13a, 13b arranged on a surface of an outer peripheral wall 12 of the pillar shaped honeycomb structure 11; two or more underlayers 36 provided on each of the electrode layers 13a, 13b and spaced apart from each other; and metal electrodes 34a, 34b. In contrast to the underlayers 16 of Embodiment 1, each of the underlayers 36 does not have concave portions each having a space between the underlayer 36 and the electrode layer 13a, 13b. In Embodiment 2, the metal electrodes 34a, 34b have concave portions 31 each forming a space on the surface on the underlayer 36 side.

The electric heating type support 30 according to Embodiment 2 of the present invention includes two or more underlayers 36 that are spaced apart from each other, as in the electric heating type support 10 according to Embodiment 1. Therefore, the underlayers 36 are spaced apart from each other by providing the underlayers 36 in ranges required for fixing the metal electrodes 34a, 34b, respectively, rather than forming the underlayers 36 on the entire surface of ranges where the metal electrodes 34a, 34b are fixed, so that the temperature difference between the underlayer 36 with the metal electrode 34a, 34b fixed and the underlayer 36 with no metal electrode 34a, 34b fixed can be reduced to suppress cracking in the underlayers 36 effectively.

Further, in the electric heating type support 30 according to Embodiment 2 of the present invention, the metal electrodes 34a, 34b have the concave portions 31 each forming a space between the metal electrode 34a, 34b and the underlayer 36. According to such a structure, it is possible to reduce the contact area between the underlayer 36 and the metal electrode 34a, 34b, to suppress heat conduction from the underlayers 36 to the metal electrodes 34a, 34b, to decrease an amount of thermal expansion of the metal electrodes 34a, 34b due to heat generation during current conduction, and to suppress destruction at the interfaces between the metal electrodes 34a, 34b and the underlying layers 36.

(3. Exhaust Gas Purifying Device)

Each of the electric heating type supports according to the above embodiments of the present invention can be used for an exhaust gas purifying device. The exhaust gas purifying device includes the electric heating type support and a can body holding the electric heating type support. In the exhaust gas purifying device, the electric heating type support can be installed in an exhaust gas flow path for allowing an exhaust gas from an engine to flow. As the can body, a metal tubular member or the like for accommodating the electric heating type support can be used.

EXAMPLES

Hereinafter, Examples is illustrated for better understanding of the present invention and its advantages, but the present invention is not limited to these Examples.

Example 1

(1. Production of Circular Pillar Shaped Green Body)

Silicon carbide (SiC) powder and metallic silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide (SiC) powder and the metallic silicon (Si) powder was 100 parts by mass. The content of the pore former was 3 parts by mass when the total of the silicon carbide (SiC) powder and the metallic silicon (Si) powder was 100 parts by mass. The content of water was 42 parts by mass when the total of the silicon carbide (SiC) powder and the metallic silicon (Si) powder was 100 parts by mass. The average particle diameter of the silicon carbide powder was 20 µm, and the average particle diameter of the metallic silicon powder was 6 µm. The average particle diameter of the pore former was 20 µm. The average particle diameter of each of the silicon carbide powder, the metallic silicon powder and the pore former refers to an arithmetic mean diameter on volume basis, when measuring frequency distribution of the particle size by the laser diffraction method.

(2. Production of Honeycomb Dried Body)

The resulting pillar shaped green body was formed using an extruder having a grid pattern-like die structure to obtain a circular pillar shaped honeycomb formed body in which each cell had a square shape in a cross section perpendicular to the flow path direction of the cells. The honeycomb formed body was subjected to high-frequency dielectric heating and drying and then dried at 120° C. for 2 hours using a hot air drier, and a predetermined amount of both end faces were cut to prepare a honeycomb dried body.

(3. Preparation of Electrode Layer Forming Paste)

Metallic silicon (Si) powder, silicon carbide (SiC) powder, methyl cellulose, glycerin, and water were mixed with a planetary centrifugal mixer to prepare an electrode layer forming paste. The Si powder and the SiC powder were mixed in a volume ratio of Si powder:SiC powder=40:60. Further, when the total of $TaSi_2$ powder, Si powder, and SiC powder was 100 parts by mass, methyl cellulose was 0.5 parts by mass, glycerin was 10 parts by mass, and water was 38 parts by mass. The average particle diameter of the metallic silicon powder was 6 µm. The average particle diameter of the silicon carbide powder was 35 µm. Each of these average particle diameters refers to an arithmetic mean diameter on volume basis when a frequency distribution of particle diameters is measured by the laser diffraction method.

(4. Applying and Firing of Electrode Layer Forming Paste)

The electrode layer forming paste was then applied to the honeycomb dried body so as to have an appropriate area and a film thickness by means of a curved surface printing machine, and further dried in a hot air dryer at 120° C. for 30 minutes, and then fired together with the honeycomb dried body in an Ar atmosphere at 1400° C. for 3 hours to obtain a pillar shaped honeycomb structure.

(5. Preparation of Underlayer Forming Paste)

Metal powder (metal powder such as a NiCr-based material and stainless steel) and oxide powder (oxide powder such as Cd, alumina, mullite) were mixed in a volume ratio of the metal of 40% by volume and oxide powder of 60% by volume to produce a ceramic raw material. To the ceramic raw material were added 1% by mass of a binder, 1% by mass of a surfactant and 30% by mass of water to prepare a paste raw material. The average particle diameter of the metal powder measured by the laser diffraction method was 10 µm, and the average particle diameter of the oxide powder was 5 µm.

(6. Applying and Firing of Underlayer Forming Paste)

The underlayer forming paste as described above was applied to the electrode layers of the pillar shaped honeycomb structure by a curved surface printing machine so as to have the planar arrangement as shown in FIG. 15. Further, the underlayer forming pastes were applied such that the contact area ratios of the metal electrodes with the underlayers were 85%, 70%, 50%, and 40% by forming the groove portions in the underlayers so as to have the cross-sectional structure as shown in FIG. 3. Further, a pillar shaped honeycomb structure was prepared which did not form any groove portion in the underlayers and applied the underlayer forming paste such that the contact area ratio of the metal electrodes with the underlayers was 100%. For the formation of the groove portions, as shown in FIG. 13 as described above, the plugged parts were provided in ranges of the printing plate used in the curved surface printing, through which the paste passed, such that the paste did not partially pass, to form the groove portions in the underlayers, with the passing portions being the convex portions and the non-passing portions being the concave portions. Subsequently, the resulting pillar shaped honeycomb structures were dried in a hot air dryer at 120° C. for 30 minutes, and then fired in an Ar atmosphere at 1100° C. for 1 hour.

Each of the pillar shaped honeycomb structures had circular end faces each having a diameter of 100 mm, and a height (a length in the flow path direction of the cells) of 100 mm. The cell density was 93 cells/$cm^2$, the thickness of the partition wall was 101.6 µm, the porosity of the partition walls was 45%, and the average pore diameter of the partition walls was 8.6 µm. The thickness of each electrode layer was 0.3 mm, and the thickness of each underlayer was 0.2 mm. The electrical resistivity at 400° C. was measured by a four-terminal method using samples having the same materials as those of the honeycomb structure, the electrode layer, and the underlayer, indicating that it was 5 Ωcm, 0.01 Ωcm, and 0.001 Ωcm, respectively.

(7. Fixing of Electrode)

Fixing Method by Welding:

Comb-shaped electrodes were placed on each honeycomb structure having a plurality of underlayers, and portions where the comb-shaped electrodes and the underlayers overlapped with each other were laser-welded with a diameter of 0.5 mm.

(8. Metal Electrode Fixing Test)

A metal electrode fixing test was conducted on each honeycomb structure having a pair of metal electrodes fixed by the above method. The metal electrode fixing test was conducted for 60 seconds by applying a voltage of 50 V between the pair of comb-shaped electrodes. The presence or absence of cracking/breakage at twenty positions between the underlayers and the comb-shaped electrodes was visually observed. A case where there was no cracking/breakage was determined to be "Joining OK".

Further, temperatures of portions of the metal electrodes and the underlayers during current conduction were measured, and an amount of strain was calculated from the thermal expansion coefficients of the metal electrodes and the underlayers to calculate stress values generated in the metal electrodes and the underlayers. Using these, a "Metal Electrode-Underlayer-Generated Stress Difference (MPa)" was calculated.

TABLE 1

| | Contact Area Ratio | Metal Electrode-Underlayer-Generated Stress Difference (MPa) | Number of Cracks |
|---|---|---|---|
| Comparative Example 1 | 100% (Entire Surface Contact of Metal Electrode) | 298.6 | 18/20 |
| Example 1 | 85% | 253.4 | 9/20 |
| Example 2 | 70% | 223.4 | 4/20 |
| Example 3 | 50% | 148.1 | 0/20 |
| Example 4 | 40% | 118.0 | 3/20 |

(9. Discussion)

As can be seen from results of Table 1, in Comparative Example 1 where no concave portion (groove portion) was formed in the underlayers and the contact area ratio was 100% (entire surface contact of the metal electrodes), the metal electrode-underlayer-generated stress difference was higher and 18 cracks were generated in the evaluation of 20 positions.

On the other hand, since each of Examples 1 to 4 formed the concave portions (groove portions) in the underlayers, the metal electrode-underlayer-generated stress difference was suppressed, and the number of cracks was lower.

DESCRIPTION OF REFERENCE NUMERALS 10, 30 electric heating type support
11 pillar shaped honeycomb structure
12 outer peripheral wall
13a, 13b electrode layer
14a, 14b metal electrode
15 electrode portion
16 underlayer
17 fixing layer
18 cell
19 partition wall
21 concave portion
22, 25, 26, 27 groove portion
23 concave region
24 convex region
39, 40 printing plate
31 plugged part
32 paste
41 fine wire
42 opening

The invention claimed is:

1. An electric heating type support, comprising:
a pillar shaped honeycomb structure being configured to a ceramic, comprising: an outer peripheral wall; and a partition wall disposed on an inner side of the outer peripheral wall, the partition wall defining a plurality of cells, each of the cells extending from one end face to other end face to form a flow path;
an electrode layer disposed on a surface of the outer peripheral wall of the pillar shaped honeycomb structure;
two or more underlayers having conductivity, the underlayers being provided on the electrode layer so as to be spaced apart from each other; and
a metal electrode provided on the underlayers,
wherein a surface of each of the underlayers has a concave portion forming a space between each of the underlayers and the metal electrode.

2. The electric heating type support according to claim 1, wherein each of the underlayers has a concave-convex region provided in a mesh shape on a surface of each of the underlayers on the metal electrode side, and wherein the concave portion is a concave region of the concave-convex region.

3. The electric heating type support according to claim 1, wherein the concave portion is a groove portion extending in parallel to a plane direction of the underlayers.

4. The electric heating type support according to claim 3, wherein the groove portion has a V shape, a U shape, or a rectangular shape in a cross section perpendicular to an extending direction of the groove portion.

5. The electric heating type support according to claim 1, wherein the concave portion penetrates in each of the underlayers in a cross-sectional direction of the underlayers.

6. The electric heating type support according to claim 1, wherein an area ratio of contact surface of the underlayers with the metal electrode is from 40% to 85% relative to surface of the underlayers on the metal electrode side.

7. The electric heating type support according to claim 1, wherein on a projection plane perpendicular to a plane direction of the underlayers, an outer shape of each of the underlayers is a circle having a diameter B, and wherein a pitch A between each of the underlayers and a diameter B of each of the underlayers satisfy a relationship $B/A \leq 0.9$.

8. The electric heating type support according to claim 7, satisfying a relationship $B/A \leq 0.7$.

9. The electric heating type support according to claim 1, wherein on the projection plane perpendicular to the plane direction of the underlayers, the outer shape of each of the underlayers is a rectangle having a long side C, and wherein the pitch A between each of the underlayers and the long side C of each of the underlayers satisfy a relationship $C/A \leq 0.9$.

10. The electric heating type support according to claim 9, satisfying a relationship $C/A \leq 0.7$.

11. The electric heating type support according to claim 1, wherein the electrode layer is a pair of electrode layers disposed on the surface of the outer peripheral wall of the pillar shaped honeycomb structure, the pair of electrode layers being disposed so as to face each other across a central axis of the pillar shaped honeycomb structure.

12. An electric heating type support, comprising:
- a pillar shaped honeycomb structure being configured to a ceramic, comprising: an outer peripheral wall; and a partition wall disposed on an inner side of the outer peripheral wall, the partition wall defining a plurality of cells, each of the cells extending from one end face to other end face to form a flow path;
- an electrode layer disposed on a surface of the outer peripheral wall of the pillar shaped honeycomb structure;
- two or more underlayers having conductivity, the underlayers being provided on the electrode layer so as to be spaced apart from each other; and
- a metal electrode provided on the underlayers,
- wherein a surface of the metal electrode has a concave portion forming a space between the metal electrode and each of the underlayers.

13. An exhaust gas purifying device, comprising:
the electric heating type support according to claim 1; and
a can body holding the electric heating type support.

* * * * *